US011228254B2

United States Patent
Feng

(10) Patent No.: US 11,228,254 B2
(45) Date of Patent: Jan. 18, 2022

(54) POWER CONVERTERS, POWER DISTRIBUTION SYSTEMS AND METHODS OF CONVERTING POWER

(71) Applicant: Hamilton Sundstrand Corporation, Charlotte, NC (US)

(72) Inventor: Frank Z. Feng, Loves Park, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/884,251

(22) Filed: May 27, 2020

(65) Prior Publication Data
US 2020/0287475 A1  Sep. 10, 2020

Related U.S. Application Data

(63) Continuation of application No. 16/257,907, filed on Jan. 25, 2019, now Pat. No. 10,742,133.

(51) Int. Cl.
*H02M 7/08* (2006.01)
*H01F 30/02* (2006.01)
*H01F 30/12* (2006.01)
*H02M 7/219* (2006.01)
*H02M 7/06* (2006.01)

(52) U.S. Cl.
CPC .............. *H02M 7/08* (2013.01); *H01F 30/02* (2013.01); *H01F 30/12* (2013.01); *H02M 7/219* (2013.01); *H02M 7/064* (2013.01)

(58) Field of Classification Search
CPC ........ H02M 7/08; H02M 7/219; H02M 7/064; H01F 30/02; H01F 30/12
See application file for complete search history.

(56) References Cited

U.S. PATENT DOCUMENTS

| 6,950,322 | B2 | 9/2005 | Ferens |
| 7,277,302 | B2 | 10/2007 | Gazel et al. |
| 7,813,147 | B2 | 10/2010 | Blanchery |
| 8,737,097 | B1 | 5/2014 | Swamy |
| 8,873,263 | B2 * | 10/2014 | Feng ........................ H01F 30/02 363/143 |
| 9,419,538 | B2 | 8/2016 | Furmanczyk et al. |

(Continued)

FOREIGN PATENT DOCUMENTS

| CA | 1175901 A | 10/1984 |
| EP | 2579430 A2 | 4/2013 |

OTHER PUBLICATIONS

Chivite-Zabala Fco J et al., "A Passive 36-Pulse AC-DC Converter With Inherent Load Balancing Using Combined Harmonic Voltage and Current Injection", IEEE Transactions on Power Electronics, Institute of Electrical and Electronics Engineers, USA, vol. 22, No. 3, May 1, 2007, pp. 1027-1035.

(Continued)

*Primary Examiner* — Kyle J Moody
(74) *Attorney, Agent, or Firm* — Cantor Colburn LLP

(57) ABSTRACT

A dual-output AC-DC power converter with balanced DC output voltages is described. The DC power source has balanced DC voltage outputs relative to DC midpoint irrespective of DC load imbalance. The input to the power source is three-phase four-wire AC voltage source. Current draws from the AC three-phase voltage source have 12-pulse near sinusoidal waveform. Ripple voltage from DC positive rail to DC negative rail is 12-pulse.

20 Claims, 4 Drawing Sheets

(56) References Cited

U.S. PATENT DOCUMENTS

| | | |
|---|---|---|
| 9,692,311 B2 | 6/2017 | Kim et al. |
| 9,837,926 B2 | 12/2017 | Burgos |
| 10,199,161 B2 | 2/2019 | Valdivia-Guerrero et al. |
| 2007/0086125 A1 | 4/2007 | Baker |
| 2008/0013352 A1 | 1/2008 | Baker |
| 2008/0165553 A1 | 7/2008 | Swamy |
| 2009/0067206 A1 | 3/2009 | Oguchi et al. |
| 2010/0176755 A1 | 7/2010 | Hoadley et al. |
| 2013/0088017 A1* | 4/2013 | Jia .................. H02K 3/28 290/1 A |
| 2015/0228397 A1 | 8/2015 | Sorel et al. |
| 2015/0256099 A1* | 9/2015 | Huang ............. H02M 7/06 363/64 |
| 2015/0285871 A1 | 10/2015 | Pollard et al. |
| 2016/0012960 A1* | 1/2016 | Huang ............. H02M 7/04 363/64 |
| 2016/0134211 A1 | 5/2016 | Rollin et al. |
| 2018/0076623 A1 | 3/2018 | Wilhide et al. |
| 2018/0337612 A1* | 11/2018 | Dhokkar .............. H01F 30/12 |
| 2020/0244179 A1 | 7/2020 | Feng |

OTHER PUBLICATIONS

European Search Report for European Application No. 19211316.5, International Filing Date Nov. 25, 2019, dated Jun. 12, 2020, 11 pages.

Multipulse AC-DC Converters for Improving Power Quality: A Review, B. Singh, S. Gairola, B.N. Singh, A. Chandra; K. Al-Haddad. IEEE Transactions on Power Electronics, vol. 23, No. 1, Jan. 2008, pp. 260 ff.

Rivera M et al., "Three-Phase AC-DC Converters with Passive, Active and Hybrid Current Injection Circuits—Part I", 2018 IEEE Biennial Congress of Argentina (ARGENCON), IEEE, Jun. 6, 2018, pp. 1-7.

* cited by examiner

POWER CONVERTERS, POWER DISTRIBUTION SYSTEMS AND METHODS OF CONVERTING POWER

CROSS-REFERENCE TO RELATED APPLICATIONS

This application is a Continuation of U.S. application Ser. No. 16/257,907, filed Jan. 25, 2019, the disclosure of which is incorporated herein by reference in its entirety.

BACKGROUND

The subject matter disclosed herein generally relates to power converters, and more particularly to AC-DC power converters for electrical systems such as in aircraft.

Vehicles, such as aircraft, commonly carry AC generators to generate AC power during flight for powering electrical devices carried by the aircraft. The AC power is typically converted to DC power by a power converter, which provides DC power by applying positive and negative voltages at DC output terminals of the converter relative to a reference voltage. In high power systems the AC power is provided by a polyphase AC source with two or more phase groups, such as a 6-phase AC power source, each phase group having a neutral phase and each neutral phase having a voltage that is different from the voltage of the other. Since the neutral phases have different voltages the reference voltage available from the power converter is uncommitted, and is typically allowed to float relative to the voltages at the neutral phases of the phase groups.

While generally advantageous in terms of efficiency, the uncommitted reference voltage can be load dependent. Further, both the generator and conductors connecting the generator to the converter must be sized for the 6-pulse non-linear current of the converter rectifier—which can require that the generator and converter be more massive than would be required. And in some 6-phase generators the voltage difference between the neutral phase of the generator phase groups can also be imbalanced due to the generator winding end turns, driving DC imbalance currents in the converter transformers, adding weight to the converter.

Such converters and power systems employing such converters have generally been considered satisfactory for their intended purpose. However, there remains a need for improved AC-DC converters, electrical systems employing such converters, and methods of converting AC power to DC power. The present disclosure provides a solution to this need.

BRIEF SUMMARY

An AC-DC power converter includes an AC feeder, an autotransformer connected to the AC feeder, and a rectifier connected to the autotransformer. A DC midpoint terminal is connected to the rectifier and an AC source neutral phase lead is connected to the DC midpoint terminal to fix voltage at the DC midpoint terminal to voltage at an AC source neutral phase.

In addition to one or more of the features described above, or as an alternative, further embodiments may include wherein the AC feeder comprises an A-phase lead, a B-phase lead, and a C-phase lead each connected to the autotransformer.

In addition to one or more of the features described above, or as an alternative, further embodiments may include wherein the AC feeder comprises no additional phase leads beyond the A-phase lead, a B-phase lead, and a C-phase lead.

In addition to one or more of the features described above, or as an alternative, further embodiments may include an AC source connected to the autotransformer by the A-phase lead, the B-phase lead, and the C-phase lead, wherein the AC source is a 3-phase AC source.

In addition to one or more of the features described above, or as an alternative, further embodiments may include wherein the autotransformer is a 12-pulse autotransformer.

In addition to one or more of the features described above, or as an alternative, further embodiments may include wherein the rectifier is a first rectifier connected to the autotransformer by a first phase group and further comprising a second rectifier connected to the autotransformer by a second phase group.

In addition to one or more of the features described above, or as an alternative, further embodiments may include wherein the first phase group comprises a first phase group A-phase lead, a first phase group B-phase lead, and a first phase group C-phase lead.

In addition to one or more of the features described above, or as an alternative, further embodiments may include wherein the second phase group comprises a second phase group A-phase lead, a second phase group B-phase lead, and a second phase group C-phase lead.

In addition to one or more of the features described above, or as an alternative, further embodiments may include wherein at least one of the first rectifier and the second rectifier is a passive rectifier.

In addition to one or more of the features described above, or as an alternative, further embodiments may include wherein at least one of the first rectifier and the second rectifier is a 3-phase full-wave diode bridge rectifier.

In addition to one or more of the features described above, or as an alternative, further embodiments may include wherein voltage applied to the first phase group is offset from voltage applied to the second phase group by 30 degrees.

In addition to one or more of the features described above, or as an alternative, further embodiments may include an interphase transformer connecting the rectifier to the DC midpoint terminal.

In addition to one or more of the features described above, or as an alternative, further embodiments may include wherein the interphase transformer is a first interphase transformer and further comprising a second interphase transformer, the second interphase transformer connecting the DC midpoint terminal to the rectifier.

In addition to one or more of the features described above, or as an alternative, further embodiments may include a DC positive terminal connected to the rectifier.

In addition to one or more of the features described above, or as an alternative, further embodiments may include a DC load connected between the DC positive terminal and the DC midpoint terminal.

In addition to one or more of the features described above, or as an alternative, further embodiments may include a DC negative terminal connected to the rectifier and a DC load connected between the DC negative terminal and the DC midpoint terminal. The DC load can imbalanced relative to a DC load connected between the DC positive terminal and the DC midpoint terminal.

In addition to one or more of the features described above, or as an alternative, further embodiments may include an AC source having a neutral phase, wherein the neutral phase is connected to the DC midpoint terminal by the AC source neutral phase lead.

In addition to one or more of the features described above, or as an alternative, further embodiments may include wherein the AC source neutral phase and the AC source neutral phase lead are both connected to a chassis ground of an aircraft.

In certain embodiments a power distribution system is provided. The power distribution system includes an AC-DC power converter as described above. The AC feeder includes an A-phase lead, a B-phase lead, and a C-phase lead each connected to the autotransformer. An AC source is connected to the autotransformer by the A-phase lead, the B-phase lead, and the C-phase lead, the AC source being a 3-phase AC source. The AC source has a neutral phase that is connected to the DC midpoint terminal by the AC source neutral phase lead. The rectifier is a first rectifier connected to the autotransformer by a first phase group and a second rectifier is connected to the autotransformer by a second phase group, the first phase group including a first phase group A-phase lead, a first phase group B-phase lead, and a first phase group C-phase lead, and the second phase group including a second phase group A-phase lead, a second phase group B-phase lead, and a second phase group C-phase lead. A DC positive terminal and a DC negative terminal are connected to the rectifier. A positive-side DC load is connected between the DC positive terminal and the DC midpoint terminal. A negative-side DC load connected between the DC negative terminal and the DC midpoint terminal, the negative-side DC load being imbalanced relative to a positive-side DC load connected between the DC positive terminal and the DC midpoint terminal.

In certain embodiments a method of converting AC power into DC power is provided. The method includes receiving AC power from a 3-phase AC source having a neutral phase through an AC feeder at an AC-DC power converter, the AC-DC power converter having an autotransformer connected to the AC feeder, a rectifier connected to the autotransformer, wherein the DC midpoint terminal connected to the rectifier, and an AC source neutral phase lead connected to the DC midpoint terminal. The AC power is divided into a first phase group and a second phase group. The second phase group is shifted relative to the first phase group and the AC power in the first phase group and the second phase group is rectified. The rectified AC power is applied as positive and negative voltages relative to the neutral phase of the 3-phase DC source.

Technical effects of embodiments of the present disclosure include symmetrical DC output voltages at the AC-DC power converter positive and negative output terminals that are each independent of imbalance between electrical load applied across the DC positive terminal and the DC midpoint and electrical load applied across the DC negative terminal and the DC midpoint terminal.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF DRAWINGS

The following descriptions should not be considered limiting in any way. With reference to the accompanying drawings, like elements are numbered alike.

DETAILED DESCRIPTION

Figure 1:
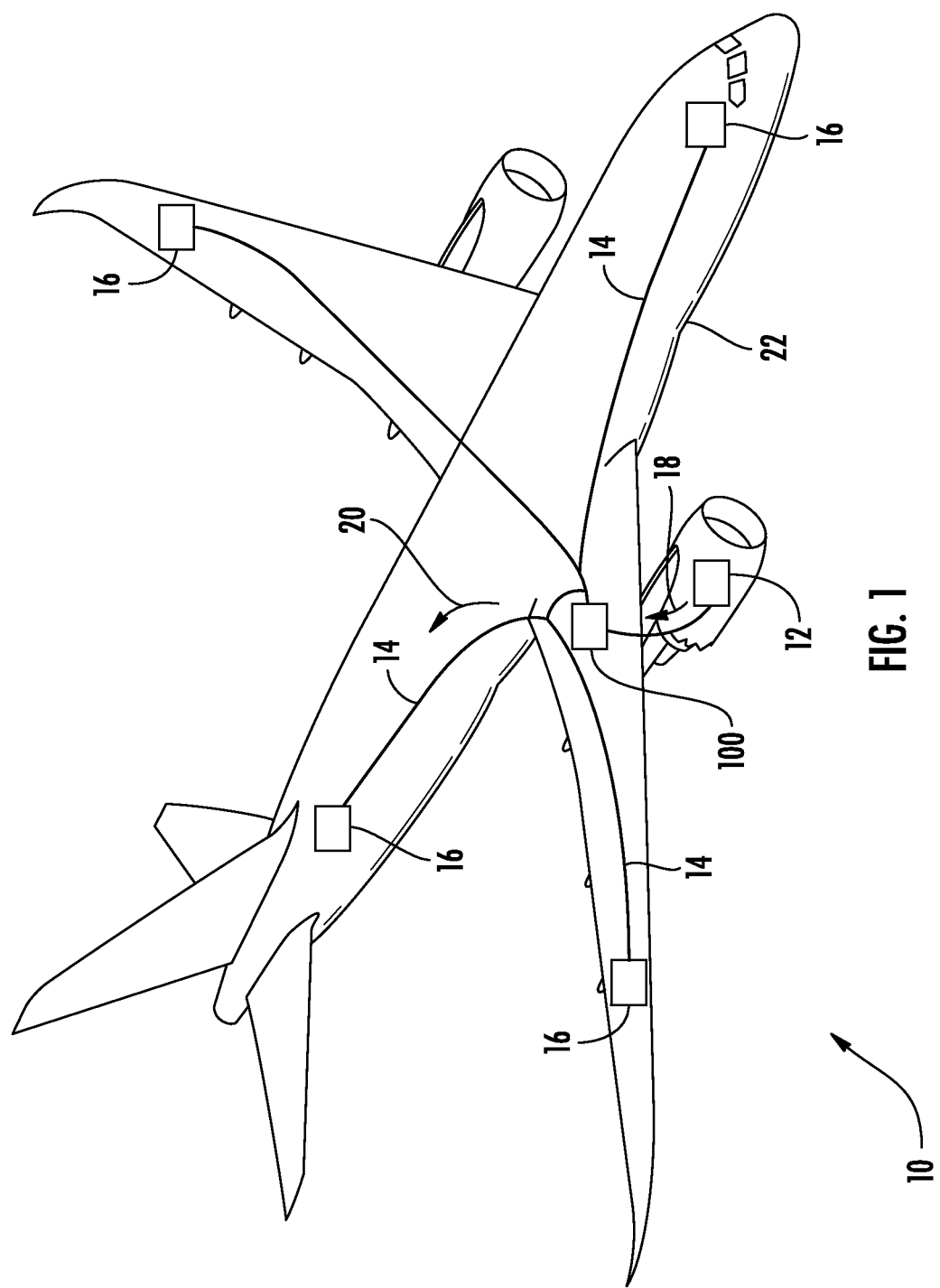
FIG. 1 is a schematic view of a power distribution system for an aircraft constructed in accordance with the present disclosure, showing an AC-DC power converter connecting a generator to DC loads carried by the aircraft.

Reference will now be made to the drawings wherein like reference numerals identify similar structural features or aspects of the subject disclosure. For purposes of explanation and illustration, and not limitation, a partial view of an exemplary embodiment of an alternating current (AC) to direct current (DC) power converter in accordance with the disclosure is shown in FIG. 2 and is designated generally by reference character 100. Other embodiments of AC-DC converters, power distributions including AC-DC converters, and method of balancing voltage at DC positive and negative terminals of an AC-DC power converter relative to a DC midpoint terminal in accordance with the present disclosure, or aspects thereof, are provided in FIGS. 1, 3 and 4, as will be described. The systems and methods described herein can be used for supplying power to electrical devices in vehicles, such as aircraft, though the present disclosure is not limited to aircraft or to vehicular power distribution systems in general.

Figure 2:
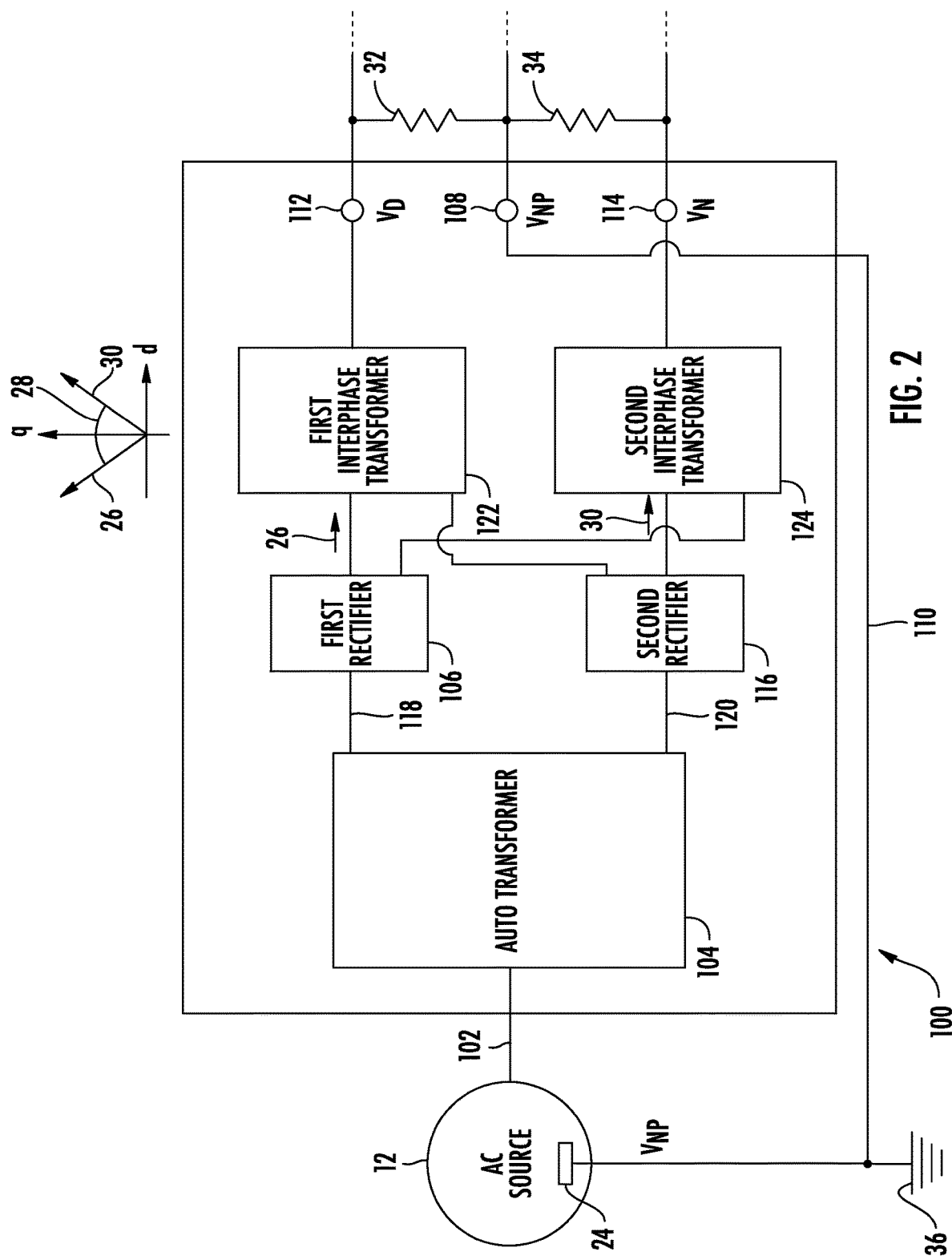
FIG. 2 is a schematic view of the power converter of FIG. 1, showing the DC midpoint terminal of the AC-DC power converter connected to the neutral phase of an AC source connected to the AC-DC power converter.

Referring to FIG. 1, a power distribution system 10 is shown. The power distribution system 10 includes an AC power source 12, a DC power bus 14 and a plurality electrical devices 16. The AC power source 12 is a polyphase AC power source, is connected to the AC-DC power converter 100, and is configured to provide AC power 18 to the AC-DC power converter 100. The AC-DC power converter 100 is configured and adapted to convert the AC power 18 received from the AC power source 12 into DC power 20, which the AC-DC power converter 100 provides to the DC power bus 14. The DC power bus 14 connects the AC-DC power converter 100 to the electrical devices 16 and provides the DC power 20 received from the AC-DC power converter 100 to the electrical devices 16. As shown in FIG. 1 the power distribution system 10 is carried by an aircraft 22. It is to be understood and appreciated that this is for illustration purposes only and is non-limiting, and that other types of AC-DC converters and power distribution systems can also benefit from the present disclosure.

With reference to FIG. 2, the AC-DC power converter 100 is shown. The AC-DC power converter 100 includes an AC feeder 102, an autotransformer 104, a rectifier 106, and a DC midpoint terminal 108. The autotransformer 104 is connected to the AC feeder 102, the rectifier 106 is connected to the autotransformer 104, and the DC midpoint terminal 108 is connected to the rectifier 106. An AC source neutral phase lead 110 is connected to the DC midpoint terminal 108 to fix voltage $V_{MP}$ at the DC midpoint terminal 108 to voltage $V_{NP}$ at a neutral phase 24 of the AC power source 12.

As will be appreciated by those of skill in the art, fixing the voltage $V_{MP}$ at the DC midpoint terminal 108 to the voltage $V_{NP}$ at a neutral phase 24 of the AC power source 12 ties the voltage $V_{MP}$ at the DC midpoint terminal 108 of the AC-DC power converter 10 to the voltage $V_{NP}$ at the neutral phase 24 of the AC power source 12. This causes positive voltage $V_P$ at a DC positive terminal 112 of the AC-DC power converter 100 to remain balanced with respect to negative voltage $V_N$ at a DC negative terminal 114 of the AC-DC power converter 100.

As shown in FIG. 2 the rectifier 106 is a first rectifier 106 and the AC-DC power converter 100 includes a second rectifier 116. The second rectifier 116 is connected to the autotransformer 104. In this respect the first rectifier 106 is connected to the autotransformer 104 by a first phase group 118, i.e., a first lead set, and the second rectifier 116 is connected to the autotransformer 104 by a second phase group 120, i.e. a second lead set. Connection of the first rectifier 106 by the first phase group 118 to the autotransformer 104 and connection of the second rectifier 116 by the second phase group 120 to the autotransformer 104 allows voltage 26 applied by the autotransformer 104 to the first rectifier 106 to be offset by a predetermined angle 28 relative to a voltage 30 applied by the autotransformer 104 to the second rectifier 116. In certain embodiments the predetermined angle 28 is 30-degrees, allowing for application of a 12-pulse AC current waveform.

The AC-DC power converter 100 also includes an interphase transformer 122. More specifically, the AC-DC power converter 100 includes a first interphase transformer 122 and a second interphase transformer 124. The first interphase transformer 122 connects the first rectifier 106 to the DC positive terminal 112 and the second interphase transformer 124 connects the second rectifier 116 to the DC negative terminal 114. A positive-side DC load 32 is connected between the DC positive terminal 112 and the DC midpoint terminal 108 and a negative-side DC load 34 is connected between the DC negative terminal 114 and the DC midpoint terminal 108. It is contemplated that the positive-side DC load 32 and the negative-side DC load 34 be imbalanced with respect to one another, as shown schematically in FIG. 2 with the differently-sized resistance of the loads. Notably, notwithstanding the imbalance between the positive-side DC load 32 and the negative-side DC load 34, the magnitudes of the voltage 26 (applied via the first phase group 118) and the voltage 30 (applied via the second phase group 120) be equivalent to one another (as shown by the equivalent length of the vectors in FIG. 2)—which results from connecting the DC midpoint terminal 108 to neutral phase 24 of the AC power source 12.

As additionally shown in FIG. 2, the AC-DC power converter 100 is connected to a chassis ground 36. More particularly, the AC source neutral phase lead 110 connects the DC midpoint lead terminal 108 to the chassis ground 36. This ties the voltage potential at the DC midpoint terminal 108 to the chassis ground 36 of the vehicle, e.g., aircraft 10 (shown in FIG. 1) carrying the AC-DC power converter 100. It is contemplated that, in certain embodiments, the chassis ground 36 by the chassis ground 36 of the aircraft 22 (shown in FIG. 1), the DC midpoint terminal 108 thereby being tied to the voltage potential of the chassis ground 36 of the aircraft 22.

Figure 3:
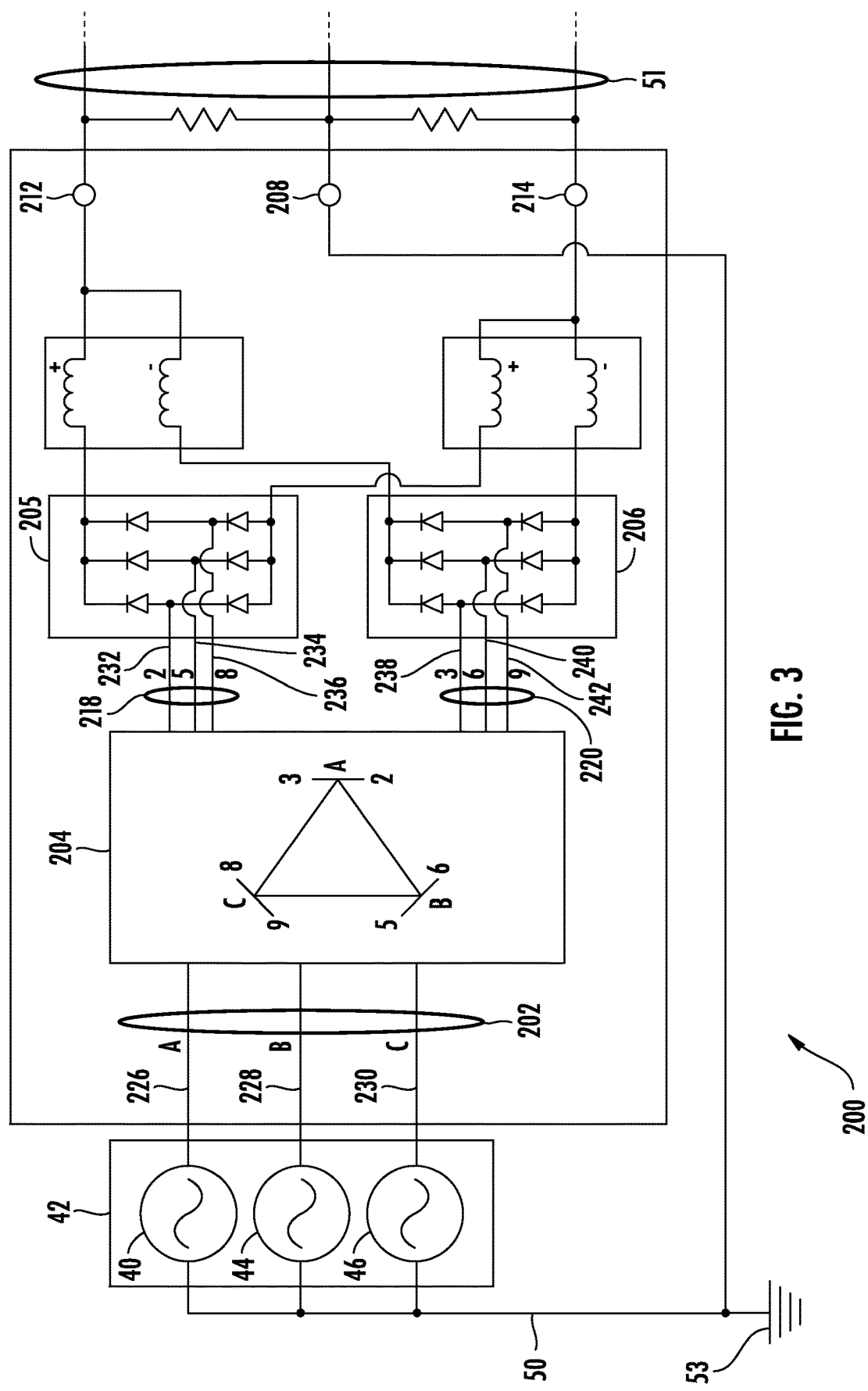
FIG. 3 is schematic view of the power converter of FIG. 1 according to an embodiment, showing a 3-phase AC source connected to the AC-DC power converter by an AC feeder to an autotransformer of the AC-DC power converter.

With reference to FIG. 3, an AC-DC power converter 200 is shown according to an embodiment. The AC-DC power converter 200 is similar to the AC-DC power converter 100 (shown in FIG. 1) and additionally includes an AC feeder 202 with three phase leads. In this respect the AC feeder 202 includes an A-phase lead 226, a B-phase lead 228, and a C-phase lead 230. Each of the phase leads connects a phase of an AC source 42 to the AC-DC power converter 200. As shown in FIG. 3 the A-phase lead 226 connects an A-phase 40 of an AC source 42 to an autotransformer 204, the B-phase lead 228 connects a B-phase 44 of the AC source 42 to the autotransformer 204, and the C-phase lead 230 connects a C-phase of the AC source 42 to the autotransformer 204. It is contemplated that the AC source 42 be a 3-phase AC source—the AC source 42 including no additional phases in this respect and being relatively lightweight in comparison to polyphase generators having more than 3-phases, e.g., 6-phase generators. It is also contemplated that the AC feeder 202 include no additional phase leads beyond the A-phase lead 226, the B-phase lead 228, and the C-phase lead 230 shown in FIG. 3—AC feeder 202 being relatively lightweight in comparison to AC feeders having more than three (3) phase leads—such as in 6-phase AC feeders.

As also shown in FIG. 3, the autotransformer 204 is a 12-pulse autotransformer connected to a first rectifier 205 and a second rectifier 206 by two phase groups each having a plurality of leads. In this respect a first phase group 218 including a first phase group A-phase lead 232, a first phase group B-phase lead 234, and a first phase group C-phase lead 236 connects the autotransformer 204 to the first rectifier 205. In a further respect a second phase group 220 including second phase group A-phase lead 238, a second phase group B-phase lead 240, and a second phase group C-phase lead 242 connects the autotransformer 204 to the second rectifier 206. It is contemplated that the first rectifier 205 and the second rectifier 206 each be passive rectifiers, each of the first rectifier 205 and the second rectifier 206 including a 3-phase full-wave diode bridge with six (6) diodes connected in parallel with one another. This arrangement allows the first rectifier 205 and the second rectifier 206 to operate in concert with one another as a 12-pulse rectifier using the two 6-pulse rectifiers in parallel with one another to supply a common DC bus 51 to limit harmonics—the DC bus 51 connected a DC midpoint terminal 208 tied to the generator neutral phase 50 to accommodate DC imbalance, as described above. As will also be appreciated by those of skill in the art, tying the DC midpoint terminal 208 to the neutral phase 50 of the AC source 42 allows the voltage applied at the positive DC terminal 212 (and associate DC feeder) and the negative DC feeder 214 (and the associated DC feeder) with respect to the chassis ground 53 to be one-half of that were the voltage at the DC midpoint terminal 208 allowed to float in relation to the neutral phase 50 to the AC source 42.

Figure 4:
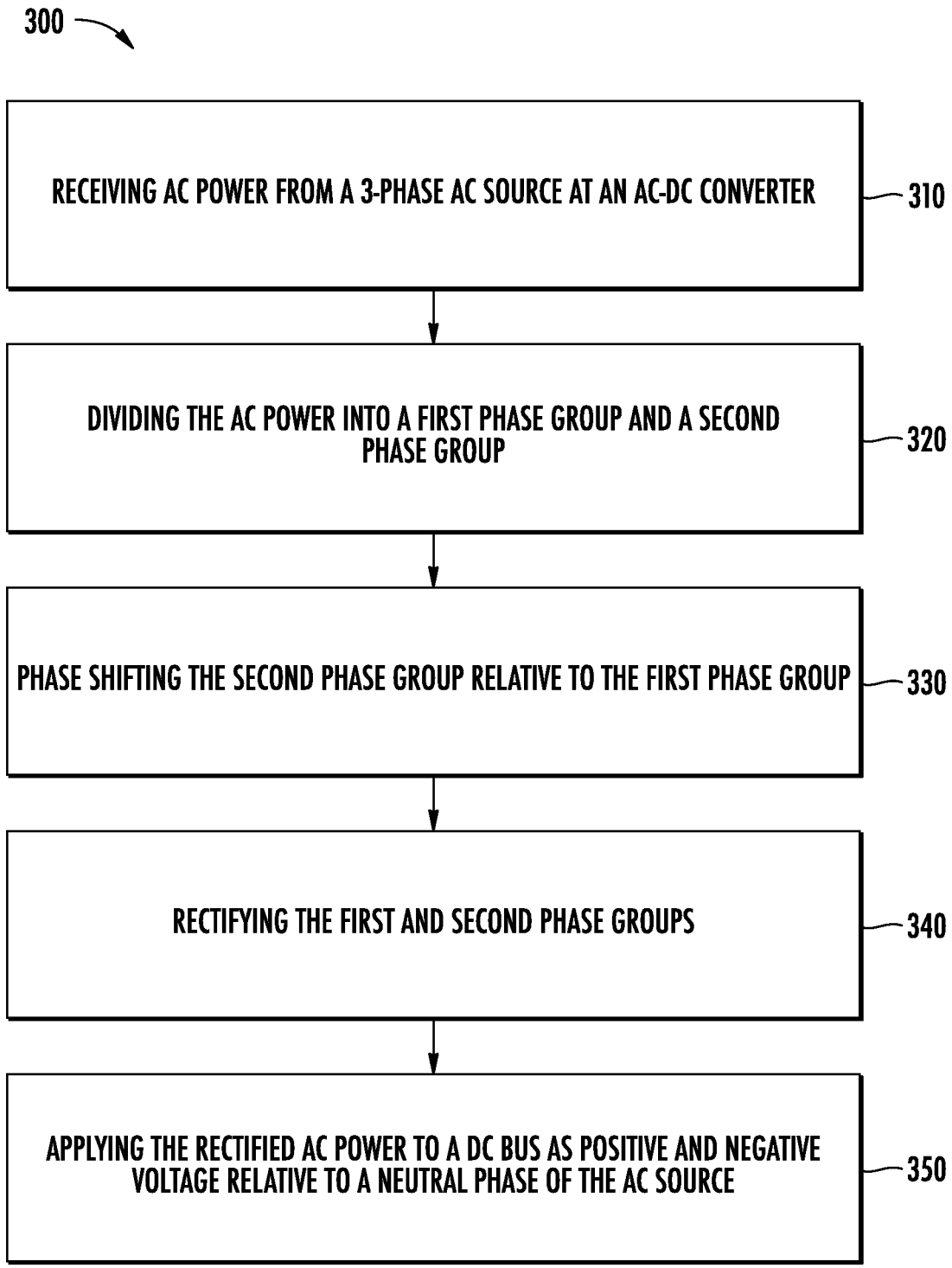
FIG. 4 is process flow diagram of a method of balancing voltage at DC positive and negative terminals of an AC-DC power converter relative to a DC midpoint terminal, showing steps of the method.

With reference to FIG. 4, a method 300 of converting AC power, e.g., the AC power 18 (shown in FIG. 1), into DC power, e.g., the DC power 20 (shown in FIG. 1), is shown. The method 300 includes receiving AC power from an AC source at an AC-DC converter, e.g., from the AC power source 12 (shown in FIG. 1) at the AC-DC power converter 100 (shown in FIG. 1), as shown with box 310. The AC power is divided into a first phase group and a second phase group, e.g., the first phase group 118 (shown in FIG. 2) and the second phase group 120 (shown in FIG. 2), as shown with box 320. The second phase group is shifted relative to the first phase group, e.g., by the predetermined angle 28 (shown in FIG. 2), as shown with box 330, and the first phase group and the second phase group rectified, as shown with box 340. The rectified power is applied to a DC bus, e.g., the DC power bus 14 (shown in FIG. 1), as shown with box 350. It is contemplated that the rectified AC power be applied to the DC bus as positive and negative voltages relative a neutral phase of the 3-phase AC source, e.g., relative to the AC neutral phase 24 (shown in FIG. 2), as also shown with box 350.

In embodiments described herein 3-phase AC power is used to feed a 12-pulse autotransformer rectifier unit. The neutral phase of the AC source providing the 3-phase AC power is tied to the DC midpoint of the DC bus to which the rectified AC power is applied. This creates a true DC midpoint, stiffening the DC midpoint and making the rectified AC power applied to the DC less apt to shift when imbalanced DC loads draw power from the 3-phase AC source, the DC voltage output applied the DC being symmetrical irrespective of load imbalance present at the unit. In certain embodiments the balance of the voltages at the output of the unit t is limited due to reduced ripple in the 12-pulse DC current flow provided by the unit.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An AC-DC power converter, comprising:
   an AC power source having an AC source neutral phase;
   an AC feeder;
   an autotransformer connected to the AC power source by the AC feeder;
   a rectifier connected to the autotransformer;
   a DC positive terminal connected to the rectifier and a positive DC load associated therewith;
   a DC negative terminal connected to the rectifier and a negative DC load associated therewith; and
   an AC source neutral phase lead electrically connecting the AC power source and a DC midpoint terminal to fix voltage at the DC midpoint terminal to voltage at the AC source neutral phase,
   wherein the positive DC load and the negative DC load are each connected between the DC midpoint terminal and the respective DC positive terminal and DC negative terminal,
   wherein the positive DC load and the negative DC load are imbalanced with respect to each other and the magnitudes of voltage at the DC positive terminal and at the DC negative terminal are equivalent to one another, and
   wherein the AC source neutral phase and the AC source neutral phase lead are both connected to a chassis ground of an aircraft.

2. The AC-DC power converter as recited in claim 1, wherein the AC feeder comprises an A-phase lead, a B-phase lead, and a C-phase lead each connected to the autotransformer.

3. The AC-DC power converter as recited in claim 2, wherein the AC feeder comprises no additional phase leads beyond the A-phase lead, the B-phase lead, and the C-phase lead.

4. The AC-DC power converter as recited in claim 2, wherein the AC power source is connected to the autotransformer by the A-phase lead, the B-phase lead, and the C-phase lead, wherein the AC power source is a 3-phase AC source.

5. The AC-DC power converter as recited in claim 1, wherein the autotransformer is a 12-pulse autotransformer.

6. The AC-DC power converter as recited in claim 1, wherein the rectifier is a first rectifier connected to the autotransformer by a first phase group and further comprising a second rectifier connected to the autotransformer by a second phase group.

7. The AC-DC power converter as recited in claim 6, wherein the first phase group comprises a first phase group A-phase lead, a first phase group B-phase lead, and a first phase group C-phase lead.

8. The AC-DC power converter as recited in claim 6, wherein the second phase group comprises a second phase group A-phase lead, a second phase group B-phase lead, and a second phase group C-phase lead.

9. The AC-DC power converter as recited in claim 6, wherein at least one of the first rectifier and the second rectifier is a passive rectifier.

10. The AC-DC power converter as recited in claim 6, wherein at least one of the first rectifier and the second rectifier is a 3-phase full-wave diode bridge rectifier.

11. The AC-DC power converter as recited in claim 6, wherein voltage applied to the first phase group is offset from voltage applied to the second phase group by 30 degrees.

12. The AC-DC power converter as recited in claim 1, further comprising an interphase transformer connecting the rectifier to the DC midpoint terminal.

13. The AC-DC power converter as recited in claim 12, wherein the interphase transformer is a first interphase transformer and further comprising a second interphase transformer, the second interphase transformer connecting the DC midpoint terminal to the rectifier.

14. A method of converting AC power into DC power, comprising:
   receiving AC power from a 3-phase AC power source having a neutral phase through an AC feeder at an AC-DC power converter, the AC-DC power converter having an autotransformer connected to the AC power source by the AC feeder, a rectifier connected to the autotransformer, a DC positive terminal connected to the rectifier and a positive DC load associated therewith, a DC negative terminal connected to the rectifier and a negative DC load associated therewith, and an AC source neutral phase lead electrically connecting the AC power source and a DC midpoint terminal, wherein the positive DC load and the negative DC load are each connected between the DC midpoint terminal and the respective DC positive terminal and DC negative terminal, wherein the positive DC load and the negative DC load are imbalanced with respect to each other and the magnitudes of voltage at the DC positive terminal and at the DC negative terminal are equivalent to one another, and wherein the AC source neutral phase and the AC source neutral phase lead are both connected to a chassis ground of an aircraft;

dividing the AC power into a first phase group and a second phase group;

phase shifting the second phase group relative to the first phase group;

rectifying the AC power in the first and second phase groups; and applying the rectified AC power as positive and negative voltages relative to the neutral phase of the 3-phase AC source.

15. The method as recited in claim 14, wherein the AC feeder comprises an A-phase lead, a B-phase lead, and a C-phase lead each connected to the autotransformer.

16. The method as recited in claim 15, wherein the AC feeder comprises no additional phase leads beyond the A-phase lead, the B-phase lead, and the C-phase lead.

17. The method as recited in claim 15, wherein the AC power source is connected to the autotransformer by the A-phase lead, the B-phase lead, and the C-phase lead, wherein the AC power source is a 3-phase AC source.

18. The method as recited in claim 14, wherein the autotransformer is a 12-pulse autotransformer.

19. The method as recited in claim 14, wherein the rectifier is a first rectifier connected to the autotransformer by a first phase group and further comprising a second rectifier connected to the autotransformer by a second phase group.

20. The method as recited in claim 14, wherein the DC midpoint terminal is connected to the rectifier, further comprising an interphase transformer connecting the rectifier to the DC midpoint terminal.

* * * * *